(12) United States Patent
Noldus et al.

(10) Patent No.: US 8,879,539 B2
(45) Date of Patent: Nov. 4, 2014

(54) METHOD OF AND A SYSTEM FOR ESTABLISHING A CALL OVER AN IP MULTI MEDIA COMMUNICATIONS SYSTEM AND A CIRCUIT SWITCHED COMMUNICATIONS SYSTEM

(75) Inventors: Rogier August Caspar Joseph Noldus, Goirle (NL); Jos den Hartog, Capelle a/d Ijssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1226 days.

(21) Appl. No.: 12/597,725

(22) PCT Filed: Apr. 26, 2007

(86) PCT No.: PCT/NL2007/000111
§ 371 (c)(1),
(2), (4) Date: Oct. 26, 2009

(87) PCT Pub. No.: WO2008/133492
PCT Pub. Date: Nov. 6, 2008

(65) Prior Publication Data
US 2010/0118862 A1    May 13, 2010

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| | | | |
|---|---|---|---|
| 7,286,545 B1 * | 10/2007 | Tester et al. | 370/401 |
| 2004/0028037 A1 * | 2/2004 | Rasanen et al. | 370/354 |
| 2005/0195762 A1 | 9/2005 | Longoni et al. | |
| 2007/0053343 A1 | 3/2007 | Suotula et al. | |
| 2011/0268110 A1 * | 11/2011 | Watson et al. | 370/352 |

FOREIGN PATENT DOCUMENTS

| | | |
|---|---|---|
| GB | 2 410 855 A | 8/2005 |
| WO | WO 2009/012807 A1 | 1/2009 |

OTHER PUBLICATIONS

3rd Generation Partnership Project: Technical Sepecification Group Services and System Aspects: "IP Multimedia System (IMS) centralized services (Release 8)" Internet Article, [Online] Mar. 2007, pp. 1-36.

(Continued)

*Primary Examiner* — Mohammad Adhami

(57) ABSTRACT

A system and method for simultaneously supporting IMS signaling and Circuit Switched signaling during a call between a calling user terminal in an IP Multi media System (IMS) and a called user terminal in a Circuit Switched CS network. A first IP address is determined by the calling user terminal, the calling user terminal initiates the call using IMS signaling towards the called user terminal, the IMS signaling comprising the first IP address. The called user terminal then initiates a CS connection towards an IP Access Converter using CS signaling and comprising the first IP address. The IP Access Converter allocates a second IP address (IP2) to be used for data transfer with the calling user terminal. The IP Access Converter establishes the CS connection by providing said second IP address to the called user terminal using CS signaling and the called user terminal establishes the call, providing said second IP address to said calling user terminal using IMS signaling. Data transfer occurs between the calling user terminal and the IP Access Converter using the first IP address and second IP address, and between the IP Access Converter and the called user terminal through the CS connection.

8 Claims, 6 Drawing Sheets

(56) References Cited

OTHER PUBLICATIONS

3GPP;3$^{rd}$ Generation Partnership Project; Technical Specification Group Services and System Aspects; Combining Circuit Switched (CS) and IP Multimedia Subsystem (IMS) services; Stage 2. (Release 8). 3GPP TS 23.279 v8.0.0 (Jun. 2007).

3GPP; 3$^{rd}$ Generation Partnership Project; Technical Specification Group Services and System Aspects; Report on Alternative Architectures for Combining CS Bearers with IMS Release 6. 3GPP TR 23.899 v1.2.0 (Jun. 2005).

* cited by examiner

METHOD OF AND A SYSTEM FOR ESTABLISHING A CALL OVER AN IP MULTI MEDIA COMMUNICATIONS SYSTEM AND A CIRCUIT SWITCHED COMMUNICATIONS SYSTEM

FIELD OF THE INVENTION

The present invention relates to communications systems and, more particularly, to data transfer between user terminals involving an IP Multi media communications System (IMS) and a Circuit Switched (CS) communications system, such as mobile CS communications system.

BACKGROUND OF THE INVENTION

Telecommunication operators are migrating their wireline and wireless networks from the existing Circuit Switched (CS) technology to an IP Multi media System (IMS). IMS has a richer call control capability than CS. With IMS, the call establishment may, for example, be enriched with multi media alerting information or caller information. IMS may be used for establishing speech calls (voice session), but also for non-call related activities, such as establishing a chat session or for transferring a file or the like.

Deployment of IMS in wireline networks is leading the deployment of IMS in wireless networks. Reason is that the radio interface in wireless networks has inherently less transmission capability than wireline connections. Voice sessions require data connection that offers "Conversational Voice" grade Quality of Service (QoS), in order to ensure low transmission latency and sufficient speech quality. For non-call related activities, the QoS grade is less critical.

The Universal Mobile Telephony System (UMTS) may be suitable for IMS based voice sessions. However, in practice, High Speed Downlink Packet Access (HSDPA) and High Speed Uplink Packet Access (HSUPA), jointly referred to as High Speed Packet Access (HSPA), may be needed to offer conversational voice QoS for a large number of subscribers.

The current mobile communications networks like the Global System for Mobile communications (GSM) and UMTS Radio Access Networks (RAN) networks do, however, have sufficient capacity for offering CS based speech connection to a large number of users.

Technologies as Wireless Local Area Network (WLAN) and the Worldwide interoperability for Microwave Access (WiMAX) offer high data transmission speeds for large numbers of subscribers. Hence, IMS speech calls, including call enrichments, may be offered through WLAN and WiMAX. However, deployment of WLAN and WiMAX will remain limited to designated spots in urban areas. Therefore, mobile users will be compelled to revert to UMTS when outside urban areas.

As a result, large scale deployment of IMS for mobile speech calls is expected not to materialise before 2008-2010. And as an aggregate result, rich call experience will not be available until then.

To overcome the above-sketched dilemma, telecommunication operators are seeking mechanisms to combine the best of both worlds: that is use IMS for (call-related) data services and use CS for speech calls. Mechanisms to combine IMS and CS, to offer enriched call experience, are known as Combinational Services. Details of Combinational Services are specified in, amongst others, the Technical Specification of the 3rd Generation Partnership Project (3GPP), 3GPP TS 23.279. Combinational Services are also known as "combination of CS and IMS services" (CSI).

A dilemma with CSI is that it remains a CS call, enriched with IMS. The service network needs to remain geared for handling the CS call. A service like IMS Multi Media Office (IMS MMO), which may be considered VPN for IMS network, would need to be aware that a served subscriber is a GSM subscriber, for example, and would have to act accordingly.

Various initiatives have started to make the access network transparent for the service network. That concept enables a network service to be "access independent". It could treat all calls as "IMS calls". If the access used for a call is non-IMS, e.g. GSM, then a designated border access gateway would need to apply suitable conversion between IMS signalling and, in this example, GSM signalling. However, due to significant differences between GSM signalling and IMS signalling, it is practically not possible to provide full access transparency towards an IMS service.

3GPP has drafted various network CSI scenarios, known as Alpha, Beta and Gamma.

The Alpha solution entails that a CS call is combined with a PS-based media session. The CS call is used for the speech connection between the calling and called party. The PS session is used for multimedia transfer. The user terminals of the calling and called party correlate the speech connection and the media session and combine these into an enriched call. The Alpha solution is standardised in 3GPP as Combinational Services.

Quintessential to the Alpha solution is that the voice call between the calling and called party is CS end-to-end. The calling party uses the Mobile Subscriber (MS) Integrated Services Digital Network (ISDN) Number (MSISDN) of the called party to set up the call. The IMS signalling between the calling and the called party runs independently of the CS call signalling between the calling and the called party.

The Beta solution entails that a user has a Session Initiation Protocol (SIP) capable terminal. When the user establishes a call, the SIP User Agent uses SIP signalling for call establishment. A control node in the IMS network establishes a CS call towards the calling party; the CS call is also connected to a MediaGateWay (MGW), for connection to the called party for this call.

Inherent complexity of the Beta solution is that the establishment of the voice call is done under control of the IMS server (i.e. SIP Application Servers) (i.e. the "Beta server"). This makes the architecture more complex. The SIP-AS has to control two SIP Sessions for a multimedia voice call establishment:

a first SIP session is established by the calling party and traverses the Beta server; the Beta server needs to be aware that this calling subscriber (or the called subscriber) requires special handling for the establishment of the speech path;

another SIP session is established for the speech path. The Beta server initiates a SIP session towards the calling party, addressing her same by MSISDN. This SIP session will be converted to ISDN User Part (ISUP) signalling and Direct Transfer Application Part (DTAP) signalling, so it can be offered to the calling subscriber. This SIP session is used to get a voice call established from a MGW to the calling party.

The Beta server then also establishes an additional SIP session towards the called party. This SIP session will also be converted to ISUP and DTAP, so it can be offered to the called party. The voice connection towards the called party will run from the MGW. Hence, voice between calling and called party is established through a centralised MGW.

The Beta server has to take additional steps to establish the speech path between the calling and the called party. This implies, amongst others, that the Beta server needs to have the MSISDNs of the calling and called party. The establishment of the CS call to the mobile calling and called party entails also ISUP routing through a Gateway Mobile Switching Centre (GMSC) and the Mobile Switching Centre (MSC), Home Location Register (HLR) interrogation etc. A possible terminating call Intelligent Network (IN) service for the calling or called party needs to be suppressed for this call. This makes Beta a complex solution.

The Gamma solution entails that a GSM terminal is connected to the GSM network as per current methodology. When the user initiates a call, standard CS signalling is used, i.e. the terminal uses DTAP signaling towards the serving MSC. The MSC will convert the DTAP signalling to the SIP signalling. The MSC has built-in Media Gateway Control Function (MGCF), enabling the MSC to route the call immediately to the IMS network. The MSC emulates an IMS User Agent, on behalf of the GSM user. When the user establishes a call, this call will be offered to the IMS network as originating IMS call.

Quintessential to the gamma solution is that the call establishment from the terminal is CS. The calling party uses the MSISDN of the called party to establish the call. A voice connection, for example, between calling and called party is established through CS signaling form the terminals.

Although SIP signaling may be present in the Gamma solution this is, however, not related to the establishment of the voice call. Such SIP signaling may be used for the transfer of multimedia components between the calling and called party.

Comparing the Alfa, Beta and Gamma solutions shows that neither thereof provides a fully transparent IMS call establishment end-to-end.

SUMMARY OF THE INVENTION

It is a first object of the present invention to provide a transparent method of establishing a call over an IP Multi media communications System and a Circuit Switched communications system.

It is a further object of the present invention to provide a communications system for supporting this transparent method for establishing a call over an IP Multi media communications System (IMS) and a Circuit Switched (CS) communications system.

In a first aspect, the present invention provides a method of establishing a call between a calling user terminal arranged for supporting sessions and signalling in an IMS, and a called user terminal arranged for supporting connections in a CS network and arranged for simultaneously supporting IMS signalling and CS signalling, the method being characterized by the steps of:
 determining by the calling user terminal a first IP address to be used for data transfer with the called user terminal,
 initiating by the calling user terminal the call using IMS signaling towards the called user terminal, the IMS signaling comprising the first IP address,
 initiating by the called user terminal in reply to the call initiation a CS connection in the CS network towards an IP Access Converter using CS signaling and comprising the first IP address,
 allocating by the IP Access Converter in relation to the CS connection a second IP address to be used for data transfer with the calling user terminal,
 establishing by the IP Access Converter the CS connection by providing the second IP address to the called user terminal using CS signaling,
 establishing by the called user terminal the call by providing the second IP address to the calling user terminal using IMS signaling, and
 wherein the data transfer is provided between the calling user terminal in the IMS and the IP Access Converter in the CS network using the first IP address and second IP address, and between the IP Access Converter in the CS network and the called user terminal through the CS connection.

According to the invention, the usage of the CS connection for carrying the data to be transferred is completely under the control of and transparent to the user terminal which makes use of the CS connection, i.e. the called user terminal. In this manner, the IMS network, also called the IMS core network, may invoke IMS service(s) as per normal, without having to take care of establishing the CS connection.

IMS signalling is used for initiating and establishing the call between the calling and the called party. Because call initiation and call establishment follows IMS principles, call enrichments are included and need not separately provided for. Initiation and establishment of the connection in the CS network is performed in accordance with existing CS methodology.

In a second aspect, the present invention provides a method of establishing a call between a calling user terminal arranged for supporting connections in a Circuit Switched, CS, network and arranged for simultaneously supporting IMS signalling and CS signalling, and a called user terminal arranged for supporting sessions and signalling in an IP Multi media System, IMS, the method being characterized by the steps of:
 initiating by the calling user terminal a CS connection in the CS network towards an IP Access Converter using CS signaling,
 allocating by the IP Access Converter in relation to the CS connection a first IP address to be used for data transfer with the called user terminal,
 establishing by the IP Access Converter the CS connection by providing the first IP address to the calling user terminal using CS signaling,
 initiating by the calling user terminal the call using IMS signaling towards the called user terminal, the IMS signaling comprising the first IP address,
 determining by the called user terminal in reply to the call initiation a second IP address to be used for the transfer of data with the calling user terminal,
 establishing by the called user terminal the call by providing the second IP address to the calling user terminal using IMS signaling,
 providing by the calling user terminal the second IP address to the IP Access Converter using CS signaling, and
 wherein the data transfer is provided between the calling user terminal and the IP Access Converter through the CS connection, and between the IP Access Converter and the called user terminal in the IMS using the first IP address and the second IP address.

In accordance with the invention, the usage of the CS connection for carrying the data to be transferred is also completely under the control of and transparent to the user terminal which makes use of the CS connection, i.e. the calling user terminal. In this manner, the IMS core network, may invoke IMS service(s) as per normal, including call enrichments, without having to take care of establishing the CS connection.

Instead of starting, by the calling user terminal, with the initiation of a CS connection, in a third aspect thereof the present invention provides a method of establishing a call between a calling user terminal arranged for supporting connections in a Circuit Switched, CS, network and arranged for simultaneously supporting IMS signaling and CS signaling, and a called user terminal arranged for supporting sessions and signaling in an IP Multi media System, IMS, the method being characterized by the steps of:

initiating the call by the calling user terminal using IMS signaling towards the called user terminal, determining by the called user terminal in reply to the call initiation a first IP address to be used for the transfer of data with the calling user terminal, providing by the called user terminal the first IP address to the calling user terminal using IMS signaling, initiating by the calling user terminal a CS connection in the CS network towards an IP Access Converter using CS signalling comprising the first IP address, allocating by the IP Access Converter in relation to the CS connection a second IP address to be used for data transfer with the called user terminal, establishing by the IP Access Converter the CS connection by providing the second IP address to the calling user terminal using CS signaling, establishing by the calling user terminal the call by providing the second IP address to the called user terminal using IMS signalling, and wherein the data transfer is provided between the calling user terminal and the IP Access Converter through the CS connection, and between the IP Access Converter and the called user terminal in the IMS using the second IP address and the first IP address.

In the method of the invention according to this third aspect, call initiation by the calling terminal is started in the IMS, by IMS signaling of the calling user terminal to the called user terminal. A CS connection towards the IP Access Converter is only initiated by the calling terminal if the called terminal accepts the call initiation by providing the first IP address to the calling terminal.

It will be appreciated that, if the call is not accepted, no CS connection will be initiated such that scarce resources in the CS network will not be unduly occupied.

Also in this embodiment of the invention, usage of the CS connections for carrying the data to be transferred is completely under the control of and transparent to the calling user terminal, and that the IMS core network may invoke IMS service(s) as per normal, including call enrichments, without having to take care of establishing the CS connection.

In a fourth aspect, the present invention provides a method of establishing a call between a calling user terminal arranged for supporting connections in a first Circuit Switched, CS, network and arranged for simultaneously supporting IMS signaling and CS signaling, and a called user terminal arranged for supporting connections in a second Circuit Switched, CS, network and arranged for simultaneously supporting IMS signaling and CS signaling, the method being characterized by the steps of:

initiating by the calling user terminal a first CS connection in the first CS network towards a first IP Access Converter using CS signaling, allocating by the first IP Access Converter in relation to the first CS connection a first IP address to be used for data transfer with the called user terminal, establishing by the first IP Access Converter the first CS connection by providing the first IP address to the calling user terminal using CS signaling, initiating by the calling user terminal the call using IMS signaling towards the called user terminal, the IMS signaling comprising the first IP address, initiating by the called user terminal in reply to the call initiation a second CS connection in the second CS network towards a second IP Access Converter using CS signaling and comprising the first IP address, allocating by the second IP Access Converter in relation to the second CS connection a second IP address to be used for data transfer with the calling user terminal, establishing by the second IP Access Converter the second CS connection by providing the second IP address to the called user terminal using CS signaling, establishing by the called user terminal the call by providing the second IP address to the calling user terminal using IMS signaling, and wherein the data transfer is provided between the calling user terminal and the first IP Access Converter through the first CS connection, and between the first IP Access Converter and the second IP Access Converter using the first IP address and the second IP address, and between the second IP Access Converter and the called user terminal through the second CS connection.

Both the calling and the called user terminal make use of a CS connection for transferring data. The calling and called user terminal, however, do not connect by a CS call end-to-end. Data transfer is partly established over an IP network between the first and second IP Access Converter, which IP network according to the invention may be the public IP network such as the internet, a private IP network or an IMS, for example. It will be appreciated that the first and second CS networks may form part of the same network or networks operated by the same telecommunication operator, for example.

In accordance with the invention, the usage of the CS connections for carrying the data to be transferred is again also completely under the control of and transparent to the user terminals, and that the IMS core network may invoke IMS service(s) as per normal, including call enrichments, without having to take care of establishing the CS connection.

In this embodiment of the invention, the call is established by starting with CS signalling first. The calling user terminal first reserves a CS connection for data transport. When initiating the call to the called user terminal, an IP address for data transfer is already available and can be signalled towards the called user terminal.

In a fifth aspect, the present invention provides a method of establishing a call between a calling user terminal arranged for supporting connections in a first Circuit Switched, CS, network and arranged for simultaneously supporting IMS signaling and CS signaling, and a called user terminal arranged for supporting connections in a second Circuit Switched, CS, network and arranged for simultaneously supporting IMS signaling and CS signaling, the method being characterized by the steps of:

initiating the call by the calling user terminal using IMS signaling towards the called user terminal, initiating by the called user terminal a first CS connection in the second CS network towards a first IP Access Converter using CS signaling, allocating by the first IP Access Converter in relation to the first CS connection a first IP address to be used for data transfer with the calling user terminal, establishing by the first IP Access Converter the first CS connection by providing the first IP address to the called user terminal using CS signaling, providing by the called user terminal the first IP address to the calling user terminal using IMS signaling, initiating by the calling user terminal a second CS connection in the first CS network towards a second IP Access Converter using CS signaling and comprising the first IP address, allocating by the second IP Access Converter in relation to the second CS connection a second IP address to be used for data transfer with the called user terminal, establishing by the second IP Access Converter the second CS connection by providing the second IP address to the calling user terminal using CS signaling, establishing by the calling user terminal the call by providing the second IP address to the called user terminal using IMS signaling, and wherein the data transfer is provided between the calling user terminal and the second IP Access Converter through the second CS connection, and between the second IP Access Converter and the first IP Access Converter using the second IP address and the first IP address, and between the first IP Access Converter and the called user terminal through the first CS connection.

Contrary to the fourth aspect, in this embodiment the calling party starts with IMS signalling. When the called party accepts the call, the further steps for establishing the required connections and IP addresses are performed. Rationale of this method is, like in the third aspect of the invention, that a CS connection to an IP Access Converter is only established if the called party accepts the call.

Of course, it will be appreciated, that the usage of the CS connections for carrying the data to be transferred is again also completely under the control of and transparent to the user terminals, and that the IMS core network may invoke IMS service(s) as per normal, including call enrichments, without having to take care of establishing the CS connection.

In the event that a MediaGateWay (MGW) is involved for data transfer over a CS connection with a user terminal, a CS connection towards an IP Access Converter is established by providing a further IP address to the IP access converter by the MGW, the further IP address being associated with the CS connection for data transfer by the IP Access Converter with the user terminal.

The IP Access Converter associates the further IP address and the respective first and second IP address, whichever is applicable, with the further IP address to effect data transfer.

According to the invention, the further IP address may be provided to the IP Access Converter by an intermediate network node in the CS network, such as a Mobile Switching Center (MSC) if the CS network is a mobile CS communications network such as, but not limited to, a mobile communications arranged for operation in accordance with a Global System for Mobile communications (GSM).

The data transfer, or media data transfer or payload may be any type of data. However, the method according to the invention is particularly suitable for the transfer of real time data, including speech data, audio data, video data, fax data, etc.

In the method according to any or all of the above disclosed aspects, a user terminal arranged for establishing a CS connection comprises an IMS client and a CS call client which are operatively connected, and wherein Session Initiation Protocol, SIP, signalling is used by the IMS client for initiating and/or establishing a call, and wherein the CS call client initiates a CS connection.

The invention further provides a communications system for supporting the method of the invention in any or all of the aspects elucidated above.

The invention also provides a user terminal comprising an IMS client and a CS call client which are operatively connected and arranged for operating in accordance with the method of the invention in any or all aspects thereof.

The invention further comprises an IP Access Converter, arranged for operating in accordance with the method of the invention in any or all aspects thereof. The IP Access Converter may be operatively arranged in and supported by at least one network node of a communications network.

The invention further relates to a network node, such as an MSC, arranged for operating in accordance with the method of the invention in any or all aspects thereof.

The above-mentioned and other features and advantages of the invention will be best understood from the following description, with reference to the enclosed drawings.

In the drawings, like reference numerals denote identical parts or parts performing an identical or comparable function or operation.

DETAILED DESCRIPTION OF PREFERRED EMBODIMENTS

The present invention will be illustrated by way of example and not by way of limitation by embodiments wherein a call is established in an IP Multi media communications System (IMS) and a mobile Circuit Switched (CS) communications system operating in accordance with the Global System for Mobile Communication (GSM). Those skilled in the art will appreciate that the invention can be implemented in a number of CS networks, both fixed and mobile communications networks.

Figure 1:
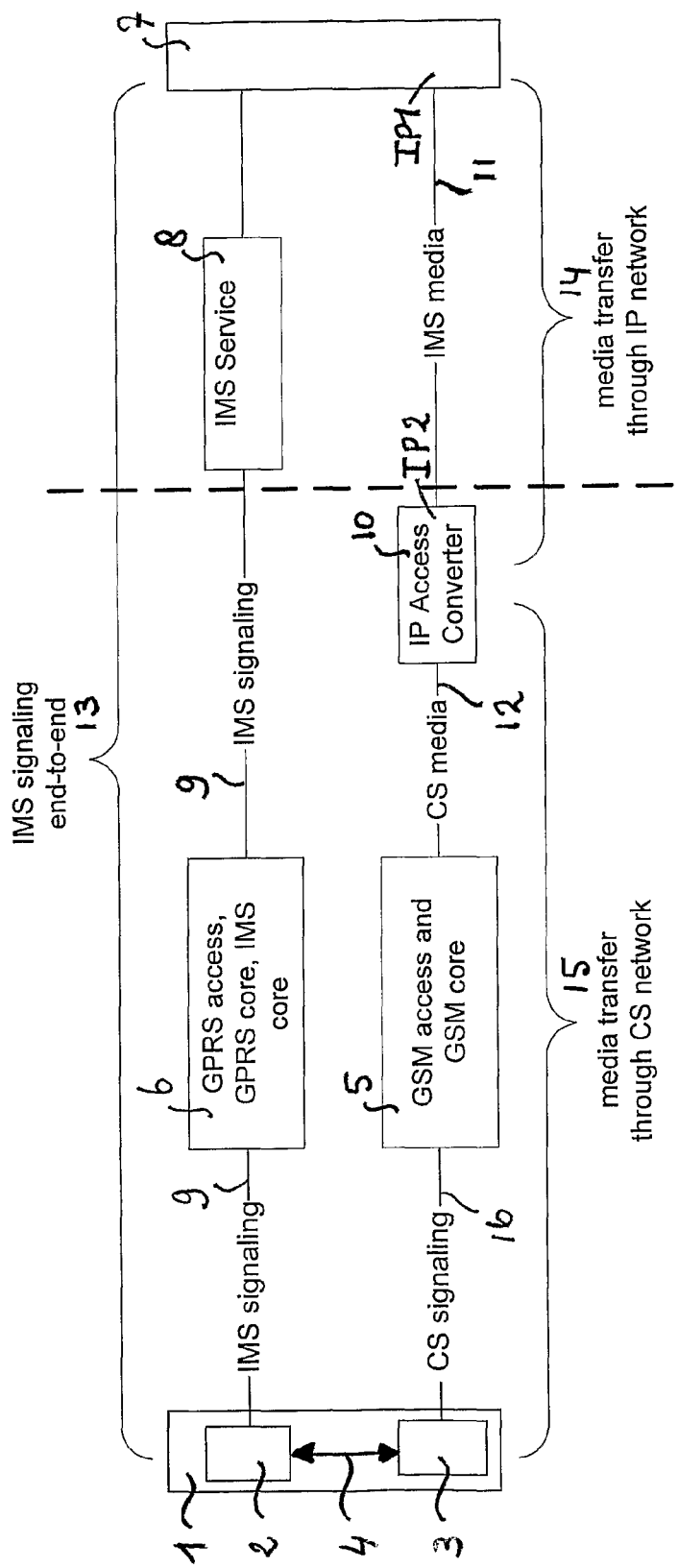
FIG. 1 is a schematic view of part of a communications system for illustrating end-to-end data transfer in accordance with the principles of the present invention.

FIG. 1 is a simplified schematic view of part of a GSM communications system and an IMS for illustrating end-to-end data transfer in accordance with the principles of the present invention.

The GSM mobile user terminal or User Equipment 1 is capable of supporting connections in a Circuit Switched, CS, network and arranged for simultaneously supporting IMS signaling and CS signaling. The signaling operations of user terminal 1 are supported by a so-called IMS client 2 and a so-called CS client 3, operating in accordance with standardized IMS signaling and CS signaling protocols, respectively. The IMS client 2 and the CS client 3 are operatively connected as indicated by a double arrow 4. When a call is initiated to this user terminal, normal Session Initiation Protocol (SIP) signalling is used towards the IMS Client in that user terminal. As indicated above, IMS signaling provides for call enrichments at call initiation and call establishment following IMS principles.

The GSM terminal 1 is GSM attached at a GSM access and GSM core 5, such as a Mobile Switching Centre (MSC). The GSM terminal 5 is attached via a General Packet Radio Service (GPRS), GPRS access, GPRS core, IMS core 6 for the establishment of a Packet Data Protocol Context (PDP Context, PDPc) and for IMS registration.

The GSM user terminal 1 supports Dual Transfer Mode (DTM), which entails that the terminal phone can have a CS connection and a Packet Switched (PS) session at the same time.

Reference numeral 7 designates an IMS user terminal capable of supporting IMS sessions for the transfer of media data, such as but not limited to speech, audio, video, pictures, fax, etc. and standard IMS signaling via an IMS Service 8 on the basis of Internet Protocol (IP) addressing, as known per se to the person skilled in the art.

The IMS Service 8 supports IMS signalling with the GPRS access, GPRS core, IMS core 6, as indicated by reference numeral 9, using standardized or normal IMS signaling.

In accordance with the invention, an IP Access Converter 10 is provided, capable of supporting media data transfer on the basis of IP addressing. In FIG. 1 the IP Access Converter 10 is arranged for supporting media data transfer with the IMS user terminal 7 via IMS, indicated by reference numeral 11.

The IP Access Converter 10 is further arranged for establishing CS connections in a CS network, for the transfer of media data via the GSM access and GSM core 5, indicated by reference numeral 12.

Assume that the user terminal 7, acting as calling user terminal, wishes to establish a call with the GSM user terminal 1, acting as called user terminal, using end-to-end IMS signalling 13.

In accordance with the invention, the following steps are performed:
- the calling user terminal 7 determines a first IP address IP1 to be used for data transfer with the called user terminal 1;
- the calling user terminal 7 initiates the call using IMS signalling 9 towards the called user terminal 1; the IMS signaling information includes the first IP address;
- in reply to the call initiation, through the IMS client 2 in the called user terminal 1, the CS client 3 initiates a CS connection in the CS network, i.e. the GSM access and GSM core 5, towards the IP Access Converter 10 using CS signaling including the first IP address;
- in response to the CS call initiation, the IP Access Converter 10 allocates in relation to the CS connection a second IP address IP2 to be used for media data transfer with the calling user terminal 7;
- the IP Access Converter 10 establishes the CS connection with the called user terminal 1 by providing the second IP address to the called user terminal 1 using CS signaling 16 via the GSM access and GSM core 5;
- the called user terminal 1 now establishes the call by providing the second IP address to the calling user terminal using IMS signaling 9 via the GPRS access, GPRS core, IMS core 6, and the IMS service 8.

The call is now established and media data transfer is provided between the calling user terminal 7 in the IMS and the IP Access Converter 10 in the Radio Network Controller CS network using the first IP address IP1 and the second IP address IP 2, indicated by reference numeral 14 and between the IP Access Converter 10 in the CS network and the called user terminal 1 through the CS connection, indicated by reference numeral 15.

When the call is initiated to the called terminal 1, normal Session Initiation Protocol (SIP) signalling is used towards the IMS Client 2 in the GSM terminal 1 using a SIP Invite message, generally called SIP Invite method. However, for clarity reasons, in the remainder the word message is adhered to.

Figure 2:
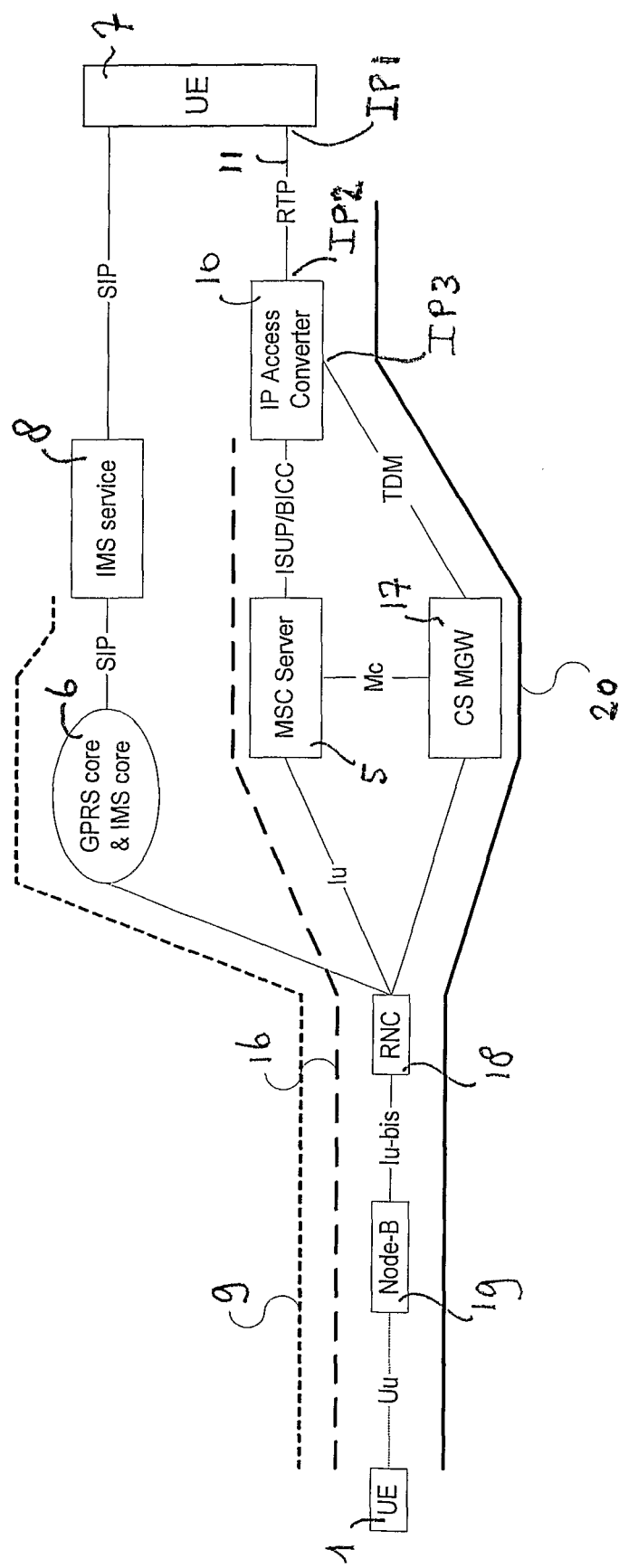
FIG. 2 is a schematic view of part of a communications system comprising a media gateway for illustrating end-to-end data transfer in accordance with the principles of the present invention.

FIG. 2 shows the case wherein the CS network comprises a CS Media GateWay (CS MGW) 17, for data transfer over a CS connection with the user terminal 1 through an intermediate Radio Network Controller (RNC) 18 and a network node 19, as known in the art.

The CS connection by the calling user terminal 1 towards the IP Access Converter 10 now includes the step of providing a further IP address IP3 to the IP Access Converter 10 by the MGW 17. The further IP address IP3 is associated with the CS connection for media data transfer by the IP Access Converter 10 with the MGW 17.

In FIG. 2, the data transfer is indicated by reference numeral 20, and the IMS signaling and CS signaling by reference numerals 9 and 16, respectively. In FIG. 2, between the called terminal 1 and the MGW 17, the data is transported using Time Division Multiplex TDM. From the MGW 17 towards the IP Access Converter 10 and from the IP Access Converter 10 towards the IP network via witch the data is transported using the first IP address IP1 and the second IP address IP1, the data is transported using Real Time transport Protocol (RTP).

The signaling between the MGW 17 and the MSC server 5 may be standardized Mc and the signaling between the IP Access Converter 10 and the MSC Server 6 may be standardized ISDN User Part of Signalling System 7 (ISUP)/Bearer Independent Call Control (BICC) interworking. Such as indicated in FIG. 2.

Figure 3:
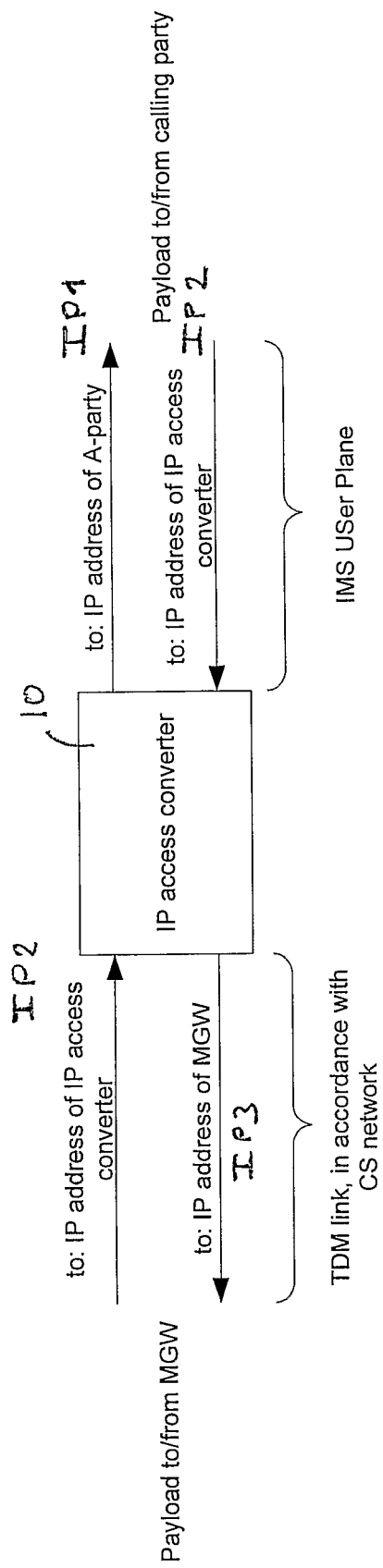
FIG. 3 is a schematic view of data transfer through an IP access Converter in a communications system of FIG. 2.

FIG. 3 reflects the media transfer through the IP access converter 10 in the embodiment of FIG. 2 using the IP addresses IP1, IP2 and IP3. In the Figure, A-party is equivalent for calling user terminal. The IP address of the IP access converter as illustrated in FIG. 3 is presently the same both for the Media Gateway (IP2) and for the A-party (also IP2). Note however that for practical purposes the IP addresses used by the MGW and the A-party could be different from each other.

Figure 4:
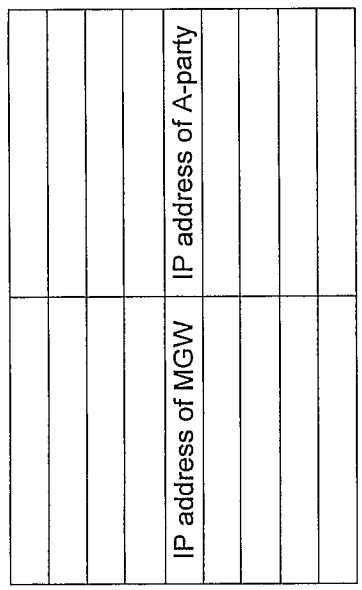
FIG. 4 is a schematic view of IP address allocation in an IP Access Converter in a communications system of FIG. 2.

FIG. 4 shows an internal table in the IP access converter 10, used for the relaying of User Plane media between the calling user terminal and the MGW of the called user terminal. The IP Access Converter uses the allocated IP address as index to the table, indicated by arrow 21. This is IP address IP2. The IP address of the MGW is IP3 and the IP address of the calling party is IP1.

From FIGS. 1 and 2, and the disclosure of the method according to the invention following aspects 2 and 3 above, the skilled person can easily identify the sequence of steps in the case that the GSM terminal 1 is the calling user terminal. In such a case, the call may be start in the CS network by CS signaling or by IMS signaling. In both cases the call enrichments of IMS signaling are maintained.

Figure 5:
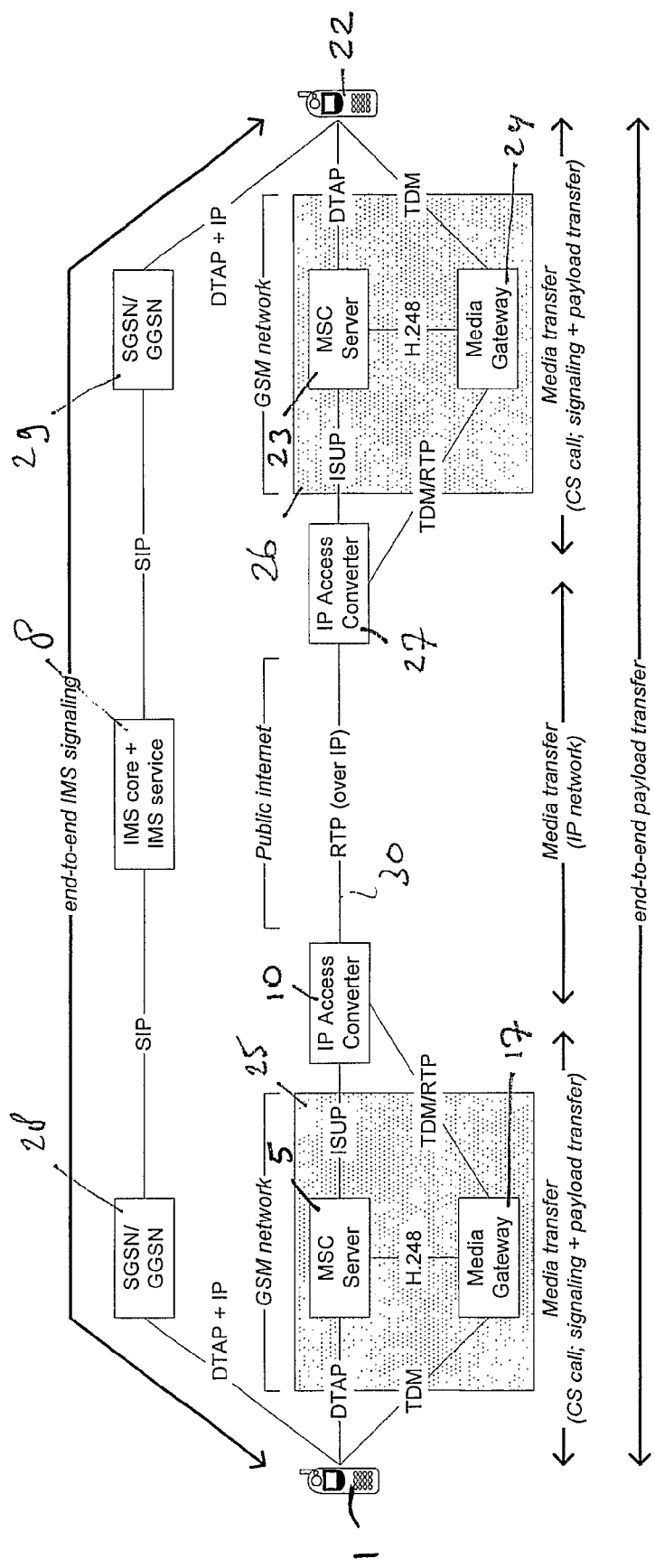
FIG. 5 is a schematic high-level overview of an IMS end-to-end call between user terminals operating in a GSM mobile communications system in accordance with the principles of the present invention.

FIG. 5 represents schematically, in a high level overview an IMS end-to-end call between two GSM terminals 1 and 22, each with an IMS client 3 and CS client 2, associated to a first CS GSM network 25 and a second CS GSM network 26, respectively. The first network 25 comprises an MSC server 5 and MGW 17 in association with a first IP Access Converter 10. The second network 26 comprises an MSC server 23 and MGW 24 in association with a second IP Access Converter 27. The first and second IP Access Converters 10, 27 support media transfer over an IP network 30, such as the internet or an intranet or the IMS.

IMS signaling is established through an IMS core and IMS service 8, and Serving GPRS Support Nodes (SGSN)/Gateway GPRS Support Node (GGSN) 28, 29. The IMS client of GSM terminal 1 is supported by SGSN/GGSN 28 and the IMS client of GSM terminal 22 is supported by SGSN/GGSN 29.

The types of signaling used between the several entities are illustrated in FIG. 5.

In the embodiment of FIG. 5, the IMS signaling runs between terminal and terminal. The GSM terminals 1, 22 are IMS registered. The GSM terminals do not need to know from their call partner that the media is transferred (partially) through GSM access. Neither do the IMS core network and service network 8 need to know, when facilitating the exchange of IP addresses for User Plane between calling and called party, that the media is transferred (partially) through GSM access.

The media between the two GSM terminals 1, 22 runs through the GSM networks 25 respectively 26 of the respective call parties, and through the IP network 30.

The media transfer through the GSM networks of the respective call parties takes place in accordance with normal GSM media transfer methodology, with a difference that the calls are established towards an IP address, instead of to a destination number.

The media transfer through the IP network 30, such as the internet, takes place in accordance with IMS methodology; this entails, e.g., that the media may be routed through media server(s) from the respective call parties.

It is important to note that the media transfer between the two IP access converters 10, 27, through the IP network 30, does not represent a call between the two call parties. The two parties have not exchanged E.164 numbers; call user addressing is done purely with SIP URI (Uniform Resource Identifier).

As disclosed in the introduction, a call may start by initiating a CS connection by the calling user terminal or by IMS signaling by the calling user terminal, ie. aspects 4 and 5, respectively.

Figure 7:
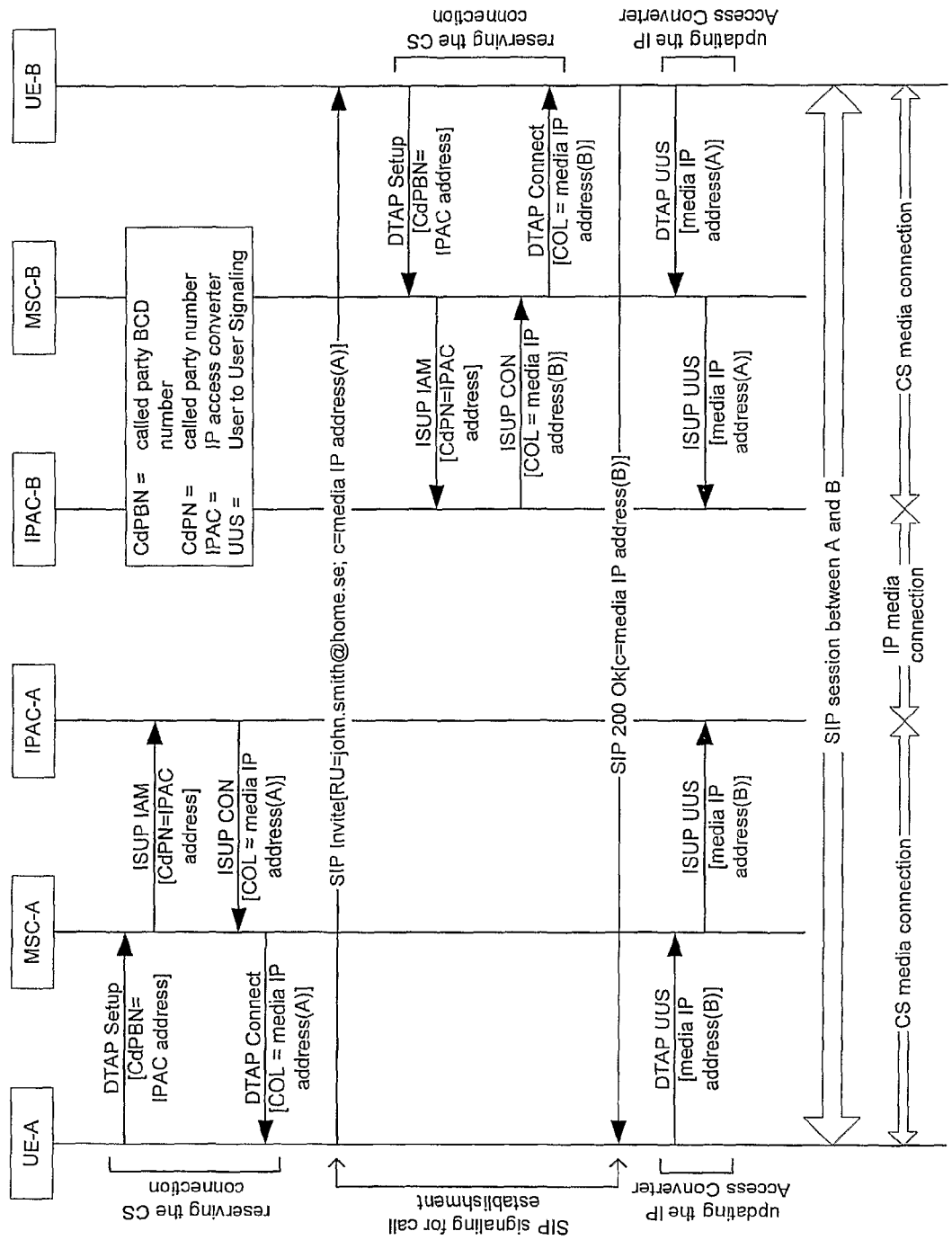
FIG. 7 shows a signalling diagram for a call between two user terminals connected to a CS network in accordance with the principles of the invention.

FIG. 7 shows a signalling diagram, running from top to bottom, for a call between two DTM terminals, for the case that the method according to aspect 5, CS call initiation, as described above, is applied. UE-A is the calling user terminal and UE-B is the called user terminal. IPAC-A represents the first IP Access Converter and IPAC-B represents the second IP Access Converter. The SIP signalling between UE-A and UE-B is indicated without reflecting all intermediate entities, such as GPRS nodes, P-CSCF, S-CSCF, SIP-AS etc. for simplicity reason in order not to hinder a clear understanding of the invention.

For the SIP signalling itself, only the SIP Invite method and the SIP 200 Ok method are reflected. There will, of course, be other SIP methods in between.

When the call is finished (SIP Bye), the calling party's UE and the called party's UE will both terminate the CS connection with the IP Access Converter.

The method described in the present invention does not entail the establishment of a CS speech call between the two call parties. This follows, amongst others, from the fact that there is no CS call-related signaling exchanged between the two parties. The CS signaling that takes place over the GSM access network and through the GSM core network, is purely meant for conveying the speech between a party in the call and an access point to the internet. All call-related signaling takes place by means of IMS signaling.

Figure 6:
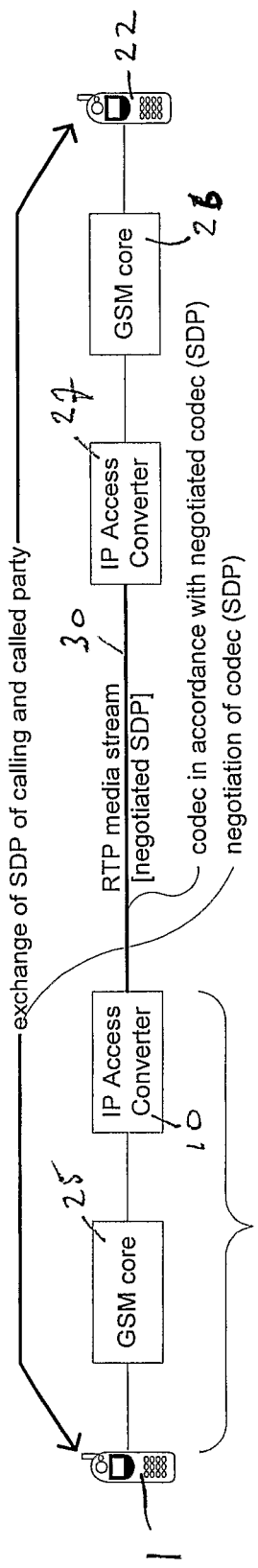
FIG. 6 is a schematic view of matching ISDN bearer capability with negotiated Session Description Protocol (SDP).

For the present invention, there is no requirement for the exchange of E.164 numbers; the two call parties are identified with their IP address (for User Plane). The usage of CS access does not need to be indicated in the SIP signaling between the two call parties, e.g. through indication in SDP. The SDP may indicate codecs that may normally be used for speech call in IMS. The UE shall choose a CS bearer that has the same capability as the requested codec. The IP access converter uses the requested codec for the RTP media transfer towards the other call party. This is reflected in FIG. 6. As a result, no special address or bearer information needs to be transported through SIP.

The present invention is not limited to the embodiments as disclosed above, and can be modified and enhanced by those skilled in the art beyond the scope of the present invention as disclosed in the appended claims without having to apply inventive skills.

The invention claimed is:

1. A method of data transfer between a first user terminal, arranged for supporting connections in a first Circuit Switched (CS) network and for simultaneously supporting Internet protocol Multi media System (IMS) signaling and CS signaling, and a second user terminal, arranged for supporting sessions and IMS signaling in an IMS, wherein said first CS network comprises a first Internet Protocol (IP) access converter arranged for supporting data transfer in said first CS network and in an IP network, said method comprising the steps of:

receiving from a media gateway a third IP address at the IP access converter;

delivering by said first IP access converter to a mobile switching center, to be delivered to said first user terminal using CS signaling in said first CS network, a second IP address to be used for data transfer by said second user terminal, the second IP address to be provided from said first user terminal to said second user terminal using end-to-end IMS signaling;

receiving by said first IP access converter from said mobile switching center using CS signaling in said first CS network, a first IP address of the second user terminal, the first IP address of the second user terminal being provided from the second user terminal to the first user terminal using end-to-end IMS signaling and being provided to the mobile switching center from the first user terminal using CS signaling; and providing data transfer:

between said first IP access converter and said mobile switching center by a CS connection in said first CS network; and between said first IP access converter and the media gateway using the third IP address;

between said IP access converter and said second user terminal using real-time protocol, RTP; and performing:

a) initiating a call using end-to-end IMS signaling between said first and second user terminals;

b1) initiating by said first user terminal a first CS connection in said first CS network towards said first IP access converter using CS signaling;

b2) allocating by said first IP access converter in relation to said first CS connection said second IP address to be used for data transfer by said second user terminal:

b3) establishing, by said first IP access converter, said first CS connection and providing said second IP address to said first user terminal using CS signaling;

c) providing said second IP address by said first user terminal to said second user terminal using end-to-end IMS signaling;

d) determining by said second user terminal said first IP address to be used for data transfer by said first user terminal;

e) providing said first IP address by said second user terminal to said first user terminal using end-to-end IMS signaling; and f) providing said first IP address by said first user terminal to said first IP access converter in said first CS network using CS signaling.

2. The method according to claim 1, wherein said step d) of determining by said second user terminal comprises the steps of:

d1) initiating by said second user terminal a second CS connection in said second CS network towards a second IP access converter using CS signaling;

d2) allocating by said second IP access converter in relation to a second CS connection said first IP address to be used for data transfer by said first user terminal; and d3) establishing by said second IP access converter said second CS connection and providing said first IP address to said second user terminal using CS signaling, and said method further comprises the step of:

g) providing said second IP address by said second user terminal to said second IP access converter In said second CS network using CS signaling.

3. The method according to claim 1, wherein said first user terminal is a calling user terminal and said second user terminal is a called user terminal, wherein said first user terminal performs said step a) of call initiation towards said second user terminal, wherein said second user terminal performs said steps d) and e) in reply to said call initiation wherein said first user terminal performs said steps b1) and f) using CS signaling comprising said first IP address, and wherein said call Is established by said first user terminal performing said step c).

4. The method according to claim 1, wherein said first user terminal is a calling user terminal and said second user terminal is a called user terminal, wherein said first user terminal performs said steps a) and b1) such that said second IP address is established and said call is initiated by said first user terminal towards said second user terminal using end-to-end IMS signaling comprising said second IP address, and wherein said call is established by said second user terminal performing said steps d) and e).

5. The method according to claim 2, wherein said first user terminal is a calling user terminal and said second user terminal is a called user terminal, wherein said first user terminal performs said steps a), b1), b2) and b3) such that said second IP address is established and said call is initiated by said first user terminal towards said second user terminal using end-to-end IMS signaling comprising said second IP address, wherein said second user terminal performs said steps d1) and g) using CS signaling comprising said second IP address, and wherein said call is established by said second user terminal performing said step e).

6. The method according to claim 1, wherein a CS network comprises a Media GateWay (MGW) for data transfer over a CS connection with a user terminal, wherein initiating a CS connection by said user terminal towards an IP access converter comprises providing a further IP address to said IP access converter by said MGW, said further IP address being associated with said CS connection for data transfer by said IP access converter with said user terminal.

7. An Internet Protocol (IP) access converter for supporting data transfer in a first Circuit Switched (CS) network and in an IP network for data transfer between a first user terminal, arranged for supporting connections in said first CS network and for simultaneously supporting Internet protocol Multi media System (IMS) signaling and CS signaling, and a second user terminal, arranged for supporting sessions and IMS signaling in an IMS, said IP access converter being arranged for:

receiving from a media gateway a third IP address at the IP access converter;

delivering to said first user terminal using CS signaling in said first CS network a second IP address to be used for data transfer by said second user terminal;

receiving from said first user terminal using CS signaling in said first CS network a first IP address for data transfer by said first user terminal, and providing data transfer:
  with said first user terminal by a CS connection in said first CS network and with said second user terminal by said IP network using said first IP address; and
  with said media gateway using time division multiplex signaling and using said third IP address performing:

a) initiating a call using end-to-end IMS signaling between said first and second user terminals;

b1) initiating by said first user terminal a first CS connection in said first CS network towards said first IP access converter using CS signaling;

b2) allocating by said first IP access converter in relation to said first CS connection said second IP address to be used for data transfer by said second user terminal:

b3) establishing, by said first IP access converter, said first CS connection and providing said second IP address to said first user terminal using CS signaling;

c) providing said second IP address by said first user terminal to said second user terminal using end-to-end IMS signaling;

d) determining by said second user terminal said first IP address to be used for data transfer by said first user terminal;

e) providing said first IP address by said second user terminal to said first user terminal using end-to-end IMS signaling; and f) providing said first IP address by said first user terminal to said first IP access converter in said first CS network using CS signaling.

8. The IP access converter according to claim 7, wherein said IP access converter in the course of a call initiation using end-to-end IMS signaling between said first and second user terminals is further arranged for:

allocating in relation to said CS connection said second IP address to be used for data transfer by said second user terminal: and establishing said CS connection.

* * * * *

UNITED STATES PATENT AND TRADEMARK OFFICE
CERTIFICATE OF CORRECTION

| | | |
|---|---|---|
| PATENT NO. | : 8,879,539 B2 | Page 1 of 1 |
| APPLICATION NO. | : 12/597725 | |
| DATED | : November 4, 2014 | |
| INVENTOR(S) | : Noldus et al. | |

It is certified that error appears in the above-identified patent and that said Letters Patent is hereby corrected as shown below:

In the Claims

In Column 12, Line 64, in Claim 1, delete "terminal:" and insert -- terminal; --, therefor.

In Column 14, Line 37, in Claim 7, delete "terminal:" and insert -- terminal; --, therefor.

In Column 14, Line 59, in Claim 8, delete "terminal:" and insert -- terminal; --, therefor.

Signed and Sealed this
Twenty-fifth Day of August, 2015

Michelle K. Lee
*Director of the United States Patent and Trademark Office*